United States Patent Office 3,027,789
Patented Apr. 3, 1962

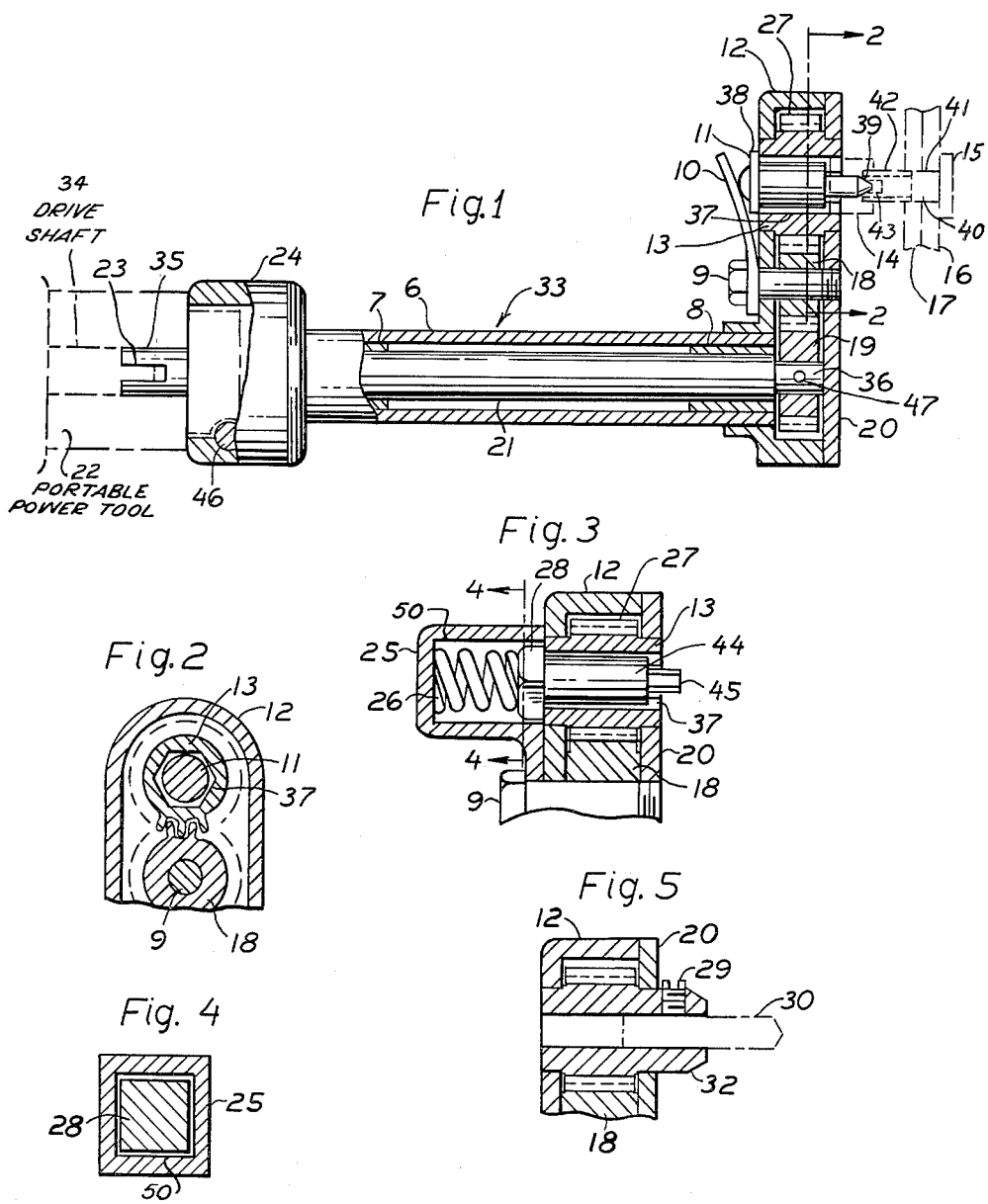

3,027,789
PORTABLE POWER-DRIVEN GEAR-ACTUATED OFFSET TORQUING TOOL
Harry L. Bochman, Jr., Seal Beach, Calif., assignor to Hi-Shear Rivet Tool Company, Torrance, Calif., a corporation of California
Filed Mar. 24, 1960, Ser. No. 17,415
7 Claims. (Cl. 81—57)

This invention relates to a power tool accessory for tightening a threaded collar onto a threaded stud.

An object of this invention is to provide a tool which is capable of reaching into areas of structure which are difficult of access or restricted in space to tighten a fastener of the above type.

A further object of this invention is to provide guidance means to locate the threaded collar on the pin where visibility is limited.

This invention is accomplished by providing a coaxial socket and guide pin, the guide pin being slidably and rotatably mounted within the socket, and the socket being driven by a gear train which offsets the axis of rotation of the socket from the axis of rotation of the power tool means. The driving gear is mounted on an extended drive shaft which provides a long reach for access to confined areas of structure.

According to another optional form of the invention, the socket may be adapted to retain and rotate tools such as drills or countersinks to produce a useful tool for drilling holes or deburring edges in difficult work areas as described above.

As still another optional form of this invention, the slidable guide pin may be keyed against rotation to the body of the tool and may be provided with a wrench shape at the guidance tip which is suitable to engage a wrenching recess in the threaded end of the threaded pin to be installed, in order to prevent rotation of the pin when the threaded collar is wrenched down upon it with the socket portion of the tool.

The above and other features of this invention will be fully understood from the following detailed description and accompanying drawings, of which:

FIG. 1 is a side view, partly in cross-section, of the presently preferred embodiment of this invention, showing a fastener being tightened thereby;

FIG. 2 is a fragmentary cross-section taken on line 2—2 of FIG. 1;

FIG. 3 is a fragmentary side view, in cross-section, showing another embodiment of this invention;

FIG. 4 is a cross-section taken at line 4—4 of FIG. 3;

FIG. 5 is a fragmentary side view in cross-section showing still another embodiment of the invention.

The preferred embodiment of this invention is shown in FIG. 1 wherein a tool 33 has a housing which may be conveniently made from two parts 12 and 20, the parts being joined together when the tool is assembled. A tubular member 6 is fixedly joined to the housing member 12. An adapter 24 suitable for attachment to a power tool with clamp screw 46 or thread means is fixedly joined to the other end of tubular member 6. A tool drive shaft 21 is rotatably mounted on bearings 7 and 8 through tubular member 6 with the axis of rotation of shaft 21 coaxial with tubular member 6. The end of the tool drive shaft 35 which passes through adapter 24 is provided with coupling means 23 to transmit torque from the output shaft 34 of a power tool 22 to which this device has been attached.

The end 36 of tool drive shaft 21 protrudes into housing 12 and has a spur gear 19 fixed with pin 47, for rotation by the drive shaft. Idler gear 18 is mounted on stud 9 within the housing 12 and is driven by spur gear 19.

Socket member 13 is journally mounted in housing member 12 and 20 and is equipped with external gear teeth 27 which engage idler gear 18 and are so driven by the idler gear. Socket member 13 has a wrench cavity 37 which is of geometric shape such as hexagonal or square, for example, which extends through the socket member 13, and is coaxial with the axis of rotation of the socket member.

Guide pin 11 is axially slidable within cavity 37 and is biased toward wrench member 13 by a spring member 10. Guide pin 11 is restrained from being pushed through wrench cavity 37 by shoulder 38 and at the opposite end has a frustro-conical shape 39 for engaging a recess in the threaded end of a threaded stud.

In FIG. 1 there is shown a fastener, in phantom, for which tool 33 is suited. The fastener consists of a pin 40 having a head 15, a portion of smooth shank 41 and a threaded portion shank 42 which has a recess 43 in the end face. For use with the embodiment of FIG. 1 the recess may be frustro-conical or circular but it will be shown in another embodiment that a polygonal wrenching recess would be convenient. The second part of the fastener is a conventional threaded nut 14 with polygonal exterior to mate with socket 37. It will be understood that the threaded end of the fastener pin may be made with a frustro-conical point and guide pin 11 may have a conical recess suitable to engage this point. This is a matter of choice for convenience in manufacture.

In use the fastener would be installed to hold two bodies 16 and 17 together and to resist a shear load in the plane of bodies 16 and 17 as well as tensile forces tending to separate the bodies. The pin 40 is forced into registering holes in bodies 16 and 17 with press-fit to prevent joint movement under shear loads. The threads 42 protrude through the bodies 16 and 17. The socket 37 and nut 14 are guided to the threaded end 42 of the pin 40 by engaging the frustro-conical end 39 of guide pin 11 with recess 43 in the fastener pin 40. As the nut 14 is turned by the rotation of socket 37, developed torque is resisted by the force fit of pin 40 in bodies 16 and 17. As nut 14 progresses down thread 42, pin 11 slides through socket 37 against the bias pressure of spring 10.

Another embodiment of the invention is shown in FIG. 3 where a second housing 25 is fastened to housing member 12. Guide pin 44 has a wrenching end 43 and head 28 of polygonal shape to match the polygonal recess 50 of housing 25. A spring 26 biases head 28 of pin 44 toward socket 37.

The embodiment of FIG. 3 would be used where the pin 40 as shown in FIG. 1 would be installed in loose fitting registering holes in bodies 16 and 17 as shown in FIG. 1. The wrench end 45 of guide pin 44 is placed in the wrenching recess 43 of such a pin 40 as is shown in FIG. 1 and serves to restrain it from turning as a nut, such as nut 14 in FIG. 1, is torqued by the socket 37. Guide pin 44 is restrained from turning by the head engaging surfaces of housing 25 which contain the head 28. Spring 26 biases guide pin 44 toward socket 37 but permits sliding retraction of guide pin 44 into housing 25 as a nut is tightened.

Still another convenient embodiment of this invention is shown in FIG. 5 where the socket member 13 shown in the embodiments of FIGS. 1 and 3 is replaced by a member 32 which is adapted to hold and transmit torque to a cutting tool 30 such as a drill as shown, a reamer, countersink or any rotating cutting tool of those general classes. Thus a hole could be drilled in an awkward location for later installation of a fastener or other cutting operations such as burring or counter sinking could be performed.

All of the above tools provide convenient means for guiding a nut onto the threaded end of a stud and torquing it down thereto in awkward locations of structure which may be difficult of access. The described tools also provide a means of making holes and performing operations such as counter sinking or burring in difficult locations.

This invention is not to be limited by the embodiments shown in the drawings and described in the description but only in accordance with the scope of the appended claims.

I claim:
1. A tool for tightening a threaded fastener in which a nut is threaded onto a threaded pin of a type which has a coaxial recess in the threaded end comprising: a tubular member; a drive shaft rotatably mounted and extending through said tubular member having an axis of rotation coaxial with said tubular member; a housing fixed to one end of said tubular member; a socket member rotatably mounted in said housing with the axis of rotation parallel to said axis of rotation of said drive shaft and said axis of rotation of said socket member displaced laterally from said axis of rotation of said drive shaft, a first end of said socket member being adapted to engage the nut to turn the same onto the pin; gear means mounted within said housing adapted to transmit rotation from said drive shaft to said socket member; a guide pin member slidably mounted within said socket member and coaxial with said socket member, said guide pin member being restrained from removal through said first end of said socket member, said guide pin member being of a length to provide an end portion which protrudes beyond said first end of said socket member; spring means mounted on said housing, said spring means biasing said guide pin member toward said first end of said socket member to axially shift the guide pin member toward a fastener to be engaged by the tool.

2. Apparatus as described in claim 1 which includes said guide pin member having a frusto-conical end portion protruding from said first end of said socket member, said frusto-conical end portion being adapted to engage a recess in the threaded end of a fastener to be installed by the tool.

3. A tool for transmitting torque which comprises: a tubular member; a tool drive shaft rotatably mounted within said tubular member, said drive shaft extending through said tubular member and said drive shaft being coaxial with said tubular member; a housing fixed to one end of said tubular member; a tool-holding member rotatably mounted in said housing with the axis of rotation parallel to said axis of rotation of said drive shaft, said axis of rotation of said member being displaced laterally from said axis of rotation of said tool drive shaft, said member being adapted to retain and transmit torque to a cutting tool; gear means mounted within said housing adapted to transmit torque from said tool drive shaft to said tool-holding member.

4. A tool for tightening a threaded fastener in which a nut is threaded onto a threaded pin comprising: a tubular member; a tool drive shaft rotatably mounted in said tubular member, said drive shaft being coaxial with said tubular member; a housing fixed to one end of said tubular member; a socket member rotatably mounted in said housing with the axis of rotation parallel to said axis of rotation of said drive shaft and said axis of rotation of the socket member being displaced laterally from said axis of rotation of said drive shaft, said socket member being adapted to engage the nut to turn the same onto the pin; a pin member having a first end and a second end, said pin member being mounted slidably in said socket, said first end of said pin member being adapted to engage the threaded pin to restrain it from turning, said pin member being restrained against rotation relative to said housing; spring means biasing said pin member toward said fastener; gear means between said tool drive shaft and said socket member to transmit torque to said socket member.

5. A tool as described in claim 4 which includes a cap member fixed to said housing, said cap member having a polygonal recess, said second end of said pin member being adapted to be restrained from rotation relative to said housing by said polygonal recess of said cap member.

6. A tool as described in claim 5 which includes coil spring means contained within said polygonal recess to bias said pin member toward said socket member.

7. Apparatus as described in claim 1 which includes said pin member being restrained against rotation relative to said housing and said protruding end of said pin member being adapted to engage a recess in the threaded end of a threaded pin to prevent rotation of the pin.

References Cited in the file of this patent
UNITED STATES PATENTS

| | | |
|---|---|---|
| 1,343,667 | Evensen | June 15, 1920 |
| 1,385,214 | Klopper | July 19, 1921 |
| 1,494,200 | Waters | May 13, 1924 |
| 1,579,818 | Kennedy | Apr. 6, 1926 |
| 1,711,520 | Decker | May 7, 1929 |
| 1,759,726 | Zigenheim | May 20, 1930 |
| 2,566,183 | Forss | Aug. 28, 1951 |
| 2,660,081 | Dossie | Nov. 24, 1953 |
| 2,882,773 | Wing | Apr. 21, 1959 |